(12) United States Patent
Morowsky et al.

(10) Patent No.: US 10,878,705 B1
(45) Date of Patent: Dec. 29, 2020

(54) AVIONIC DISPLAY SYSTEM

(71) Applicant: HONEYWELL INTERNATIONAL INC., Morris Plains, NJ (US)

(72) Inventors: Katarina Alexis Morowsky, Phoenix, AZ (US); Ivan Sandy Wyatt, Scottsdale, AZ (US); Aaron Gannon, Anthem, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/560,535

(22) Filed: Sep. 4, 2019

(51) Int. Cl.
*G08G 5/00* (2006.01)
*B64D 43/00* (2006.01)
*G06F 40/205* (2020.01)
*H04H 20/55* (2008.01)

(52) U.S. Cl.
CPC ........... *G08G 5/0008* (2013.01); *B64D 43/00* (2013.01); *G06F 40/205* (2020.01); *G08G 5/0039* (2013.01); *H04H 20/55* (2013.01)

(58) Field of Classification Search
None
See application file for complete search history.

(56) References Cited

U.S. PATENT DOCUMENTS

| | | | |
|---|---|---|---|
| 2012/0078448 A1* | 3/2012 | Dorneich | G08G 5/0013 701/3 |
| 2013/0027226 A1* | 1/2013 | Cabos | G08G 5/0021 340/961 |
| 2015/0261829 A1 | 9/2015 | Whitlow et al. | |
| 2018/0327110 A1 | 11/2018 | Shanbhag et al. | |

\* cited by examiner

*Primary Examiner* — Thomas S McCormack
(74) *Attorney, Agent, or Firm* — Lorenz & Kopf, LLP

(57) ABSTRACT

A system for displaying the effect of a change in Automatic Terminal Information Service (ATIS) broadcast. The system comprises a receiver module configured to receive at least two ATIS broadcasts and a parsing module operably connected to the receiver module and configured to parse the received at least two ATIS broadcasts into at least two corresponding sets of ATIS messages. The system includes a comparison module operably connected to the parsing module and configured to compare the at least two sets of ATIS messages to determine if a disparity exists between the at least two sets of ATIS messages. The system includes a display module; and a processor module operably connected to the comparison module and the display module, the processor module being configured to cause the display module to display an alert when it is determined that a disparity exists between the at least two sets of ATIS messages.

16 Claims, 9 Drawing Sheets

| Airport | Atlantic City International Airport |
|---|---|
| Airport Code | Charlie |
| Observation time | 1250z |
| Wind information | 130 at 6 |
| Visibility | 1.5 sm, clear below 13,000 |
| Temperature | 25 degrees |
| Dew-point | -2.5 degrees |
| Altimeter setting | 1884 |

FIG. 2

AVIONIC DISPLAY SYSTEM

TECHNICAL FIELD

The present disclosure generally relates to systems for displaying avionic information, and more particularly relates to a system for displaying Automatic Terminal Information Service (ATIS) information.

BACKGROUND

An Automatic Terminal Information Service (ATIS) is broadcast by many airports in order to provide pilots with local information about the airport. The local information conveyed over ATIS may include local weather information, such as local wind speeds and local visibility information; active runway information, notices to airmen (NOTAMs); and so on.

Typically, ATIS is a continuous broadcast of text or a voice recording. Pilots may listen to or otherwise study the information contained in the ATIS broadcast before engaging in communications with air traffic control (ATC), thereby reducing the workload of ATC.

The ATIS broadcast is generally updated at fixed intervals each hour, or when an act of significance occurs at the airport (such as an airport runway becoming inactive). As such, pilots can study the information contained in the ATIS broadcast at regular intervals in order to be aware of any changes in information that may affect the aircraft's landing procedure. In order to detect any changes in the ATIS broadcast, the pilot must compare the "old" ATIS information with the "new" ATIS information in the updated ATIS broadcast so as to identify any differences between the two. After identifying any differences in the subsequent ATIS broadcast, the pilot must then determine if any of the identified differences require any action to be taken by the pilot, for example updating take-off and landing data (TOLD) calculations.

The monitoring and comparison of "old" and "new" information in ATIS broadcasts increases the workload for the pilot at a time when the pilot's workload is already high (i.e., during the arrival or before the landing procedure). Furthermore, if there are any changes in the ATIS broadcast that occur when the aircraft is on approach to landing, the pilot may have to stop performing another task to update the TOLD calculations, which may cause the completion of the other task to be delayed or prevented, thereby further increasing the pilot's workload.

Still further, some avionics systems require the pilot to actively request ATIS information, for example via text messaging, via controller pilot data link communications (CPDLC) or via radio transmission. With these types of avionic systems, if the ATIS broadcast is updated at a different time to usual (for example due to a delay in the recording of the updated ATIS broadcast) then the pilot may not be aware of the new information provided in the updated ATIS broadcast.

Accordingly, it would be desirable to decrease the pilot's workload associated with studying information in ATIS broadcasts and performing actions based on this information. Other desirable features and characteristics will become apparent from the subsequent detailed description and appended claims.

BRIEF SUMMARY

This summary is provided to introduce a selection of concepts in a simplified form that are further described below in the detailed description section.

In an exemplary embodiment, there is provided a system for displaying the effect of a change in Automatic Terminal Information Service (ATIS) broadcast. The system comprises a receiver module configured to receive at least two ATIS broadcasts and a parsing module operably connected to the receiver module and configured to parse the received at least two ATIS broadcasts into at least two corresponding sets of ATIS messages. The system further includes a comparison module operably connected to the parsing module and configured to compare the at least two sets of ATIS messages to determine if a disparity exists between the at least two sets of ATIS messages. The system further includes a display module; and a processor module operably connected to the comparison module and the display module, the processor module being configured to cause the display module to display an alert when it is determined that a disparity exists between the at least two sets of ATIS messages.

In another exemplary embodiment, there is provided a method of displaying the effect of a change in Automatic Terminal Information Service (ATIS) to a pilot. The method includes the steps of receiving, using a receiver module, a first ATIS broadcast and parsing, using a parsing module, the first ATIS broadcast into a first set of ATIS messages. The method further includes the step of storing, using a memory module, the first set of ATIS messages in memory. The method further includes the step of receiving, using the receiver module, a second ATIS broadcast. The method also includes the step of parsing, using the parsing module, the second ATIS broadcast into a second set of ATIS messages. The method also includes the step of comparing, using a comparison module, the stored first set of ATIS messages to the second set of ATIS messages to determine if a disparity exists; and when a disparity is determined to exist, displaying, using a processor module and a display module, information about the disparity.

Other exemplary embodiments will be made apparent from the detailed description below.

BRIEF DESCRIPTION OF THE DRAWINGS

A more complete understanding of the subject matter may be derived from the following detailed description taken in conjunction with the accompanying drawings, wherein like reference numerals denote like elements, and wherein:

FIG. 2 shows a representation of ATIS information according to exemplary embodiments;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. There is no intention to be bound by any expressed or implied theory presented in the preceding Technical Field, Background, Brief Summary or the following Detailed Description.

For the sake of brevity, conventional techniques related to flight planning, communication methods, aircraft controls and associated components may not be described in detail herein. Furthermore, any connecting lines and arrows shown in the various figures contained herein are intended to represent example functional relationships and/or physical couplings between the various elements. It should be noted that many alternative or additional functional relationships or physical connections may be present in an embodiment of the present disclosure.

Embodiments disclosed herein provide systems and methods that allow for updates and other changes to the information in ATIS broadcasts to be conveyed to pilot in an effective and clear manner that reduces the workload of the pilot.

Figure 1:
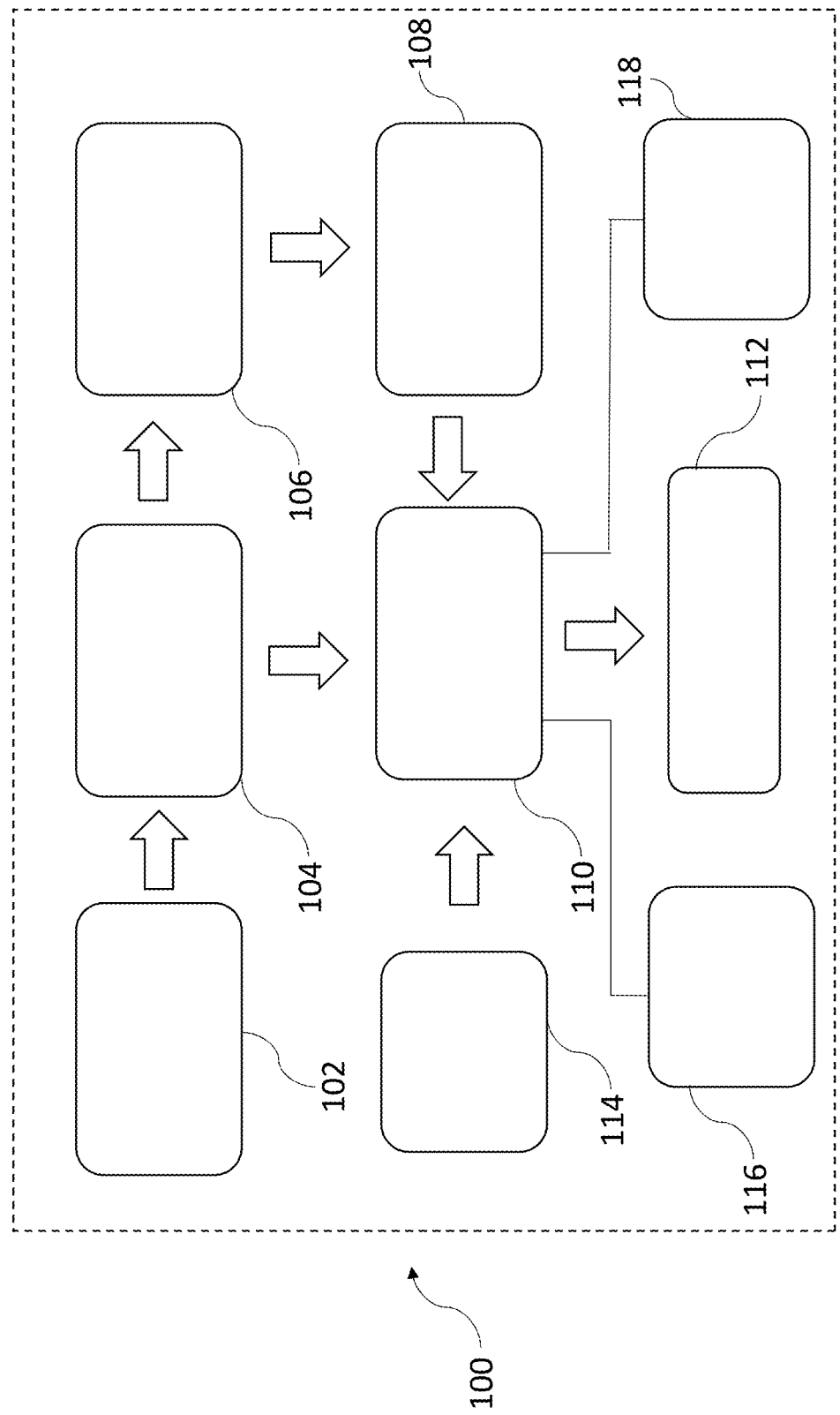
FIG. 1 shows a schematic of a system according to exemplary embodiments.

FIG. 1 shows a functional schematic of a system 100 in accordance with exemplary embodiments. The system 100 includes a receiver module 102. The receiver module 102 is configured to receive ATIS information via an ATIS broadcast. In exemplary embodiments, the receiver module 102 comprises a radio receiver, for example a VHF receiver.

The system 100 also includes a parsing module 104. The parsing module 104 is configured to convert the ATIS broadcast received by the receiver module 102 into text form (if the ATIS broadcast is in the form of a voice recording), and to analyze and parse the information received by the receiver module 102. If the ATIS broadcast is in text form, the parsing module 104 is not required to further convert this ATIS broadcast, but simply analyses and parses this received text.

In exemplary embodiments, the parsing module 104 is configured to utilize speech-to-text converter software (if required) and natural language processing software to parse the overall ATIS broadcast into a set of ATIS messages. As will be explained in more detail below, the information in an ATIS broadcast is provided in a semi-standardized manner. As such, the typical ambiguity that is inherent in the parsing of spoken sentences is reduced when parsing an ATIS broadcast. In exemplary embodiments, the parsing module 104 uses a machine-learning and/or statistical approach to the parsing of the ATIS broadcast, for example through the use of a neural network.

As mentioned above, ATIS broadcasts are typically set out in a semi-standardized format, and are typically repeated every few seconds in the form of an automated or recorded human voice. An example received ATIS broadcast may be as follows:

Atlantic City International Airport information CHARLIE, one-seven-five-zero zulu observation, wind one-three-zero at six, visibility one and one-half, clear below 13,000, temperature two-five, dew point minus five, altimeter two-eight-eight-four, I-L-S approaches in progress to runway two five left and two-four right, departing runways two five right and two-four left The parsing module 104 is configured to parse the received broadcast into its constituent pieces of information. For example, for the above example received ATIS broadcast, the parsing module 104 would parse the broadcast into its constituent ATIS messages as follows:

1. "Atlantic City International Airport information CHARLIE"—the first part of this ATIS broadcast typically identifies the name of the airport and the associated ATIS code.
2. "one-seven-five-zero zulu observation"—the second part of this ATIS broadcast typically identifies the time of the observation, here 17:50 zulu time. Normally, ATIS is updated at a set time every hour, for example at 50 minutes past the hour.
3. "wind one-three-zero at six"—the third part of this ATIS broadcast provides the local wind information.
4. "visibility one and one-half"—the fourth part of this ATIS broadcast provides local visibility information, here the distance of the visibility is provided in statute miles.
5. "clear below 13,000"—the fifth part of this ATIS broadcast provides cloud information.
6. "temperature two-five, dew point minus five"—the sixth part of this ATIS broadcast provides temperature information.
7. "altimeter two-eight-eight-four"—the seventh part of this ATIS broadcast is the altimeter setting.
8. "I-L-S approaches in progress to runway two-five left and two-four right, landing runways two-five right and two-four left"—subsequent parts of this ATIS broadcast relate to approach information to the aircraft, such as current approach runway information and landing runway information.

Additional ATIS messages, such as notices to airmen (NOTAM) may be present after the approach information.

As explained above, the ATIS information may be in the form of an automated voice broadcast or recorded voice broadcast. Alternatively, the ATIS information may be provided in a non-spoken form such as in text format. If the ATIS information is provided in a non-spoken form, the parsing module 104 is configured to parse the ATIS information into a set of constituent messages in a similar manner to that as described above without a speech-to-text conversion being necessary.

After parsing the ATIS broadcast into a set of ATIS messages, the parsing module 104 is configured to transmit the parsed set of ATIS messages to a memory module 106 operably coupled to the parsing module 104. The memory module 106 is configured to store the set of parsed ATIS messages.

The parsing module 104 is further configured to transmit the set of parsed ATIS messages to a processor module 110 operably connected to the parsing module 104.

The processor module 110 is operably coupled to a display module 112. In exemplary embodiments, the display module 112 comprises a unit-mounted display, such as a primary flight display (PFD). In alternative exemplary embodiments, the display module 114 comprises a near-to-eye (NTE) display, for example a head-mounted display (HMD).

In exemplary embodiments, the processor module 110 is also optionally coupled to a flight management system 114 (FMS), which stores, amongst other information, a flight plan for the aircraft and aircraft performance data.

In exemplary embodiments, a user interface 116 is connected to the processor module 110. In various exemplary embodiments, the user interface 116 may comprise an input mechanism (such as a joystick, touchscreen, keyboard, etc.) that allows the pilot to manipulate data in conjunction with the display module 112. In exemplary embodiments, the pilot may interact with the user interface 114 to modify data (such as the parsed ATIS messages) if the need arises, for example to correct ATIS messages in the event of an incorrectly parsed ATIS broadcast.

In some configurations, pilots are required to request ATIS information from Air Traffic Control, for example by text messaging, CPDLC, or radio. In order to reduce the pilot workload in requesting this ATIS information, in exemplary embodiments the system 100 includes a transmitter module 118. When it is required to request transmission of an ATIS broadcast, the transmitter module 118 is configured to automatically request ATIS at the appropriate time, which may be a pre-determined time. If ATIS is not available at the appropriate time, the transmitter module 118 is configured to re-request ATIS information at pre-determined intervals, for example once every minute, to ensure that any updates to the ATIS information are not missed.

In use, when the processor module 110 receives a set of parsed ATIS messages from the parsing module 104, the processor module 110 is configured to cause the display module 112 to display information associated with the parsed ATIS messages to the pilot. In an exemplary embodiment, the processor module 110 is configured to cause the display module 112 to display the parsed ATIS messages in text form to the pilot. In another exemplary embodiment, the processor module 110 is configured to cause the display module 112 to display a representation of the parsed ATIS messages. This representation may be displayed in different forms.

In an exemplary embodiment, the processor module 110 is configured to cause the display module 110 to display the set of parsed ATIS messages in order in a table 200, as shown in FIG. 2. As can be seen in FIG. 2, each of the set of parsed ATIS messages 204 are displayed next to a corresponding one of a set of identifiers 202. In this manner, it is possible for the pilot to easily visually identify each piece of local information contained in the ATIS broadcast.

When a subsequent ATIS broadcast is received at the receiver module 102, the parsing module 104 parses the subsequent ATIS broadcast into a set of "new" ATIS messages. The "new" set of ATIS messages is then transmitted to a comparison module 108, which is operably coupled to the processor module 110 and the memory module 106.

The comparison module 108 is configured to compare the "new" parsed constituent ATIS messages from the new ATIS broadcast to the "previous" parsed constituent ATIS messages from the previous ATIS broadcast to determine if a disparity exists between the "new" ATIS messages and the "previous" ATIS messages. In exemplary embodiments, the comparison module 108 is configured to compare each "new" parsed ATIS message to the corresponding "previous" ATIS message to determine if each "new" ATIS message is the same as the corresponding "previous" ATIS message. For example, the comparison module 108 compares the "previous" ATIS message in an initial ATIS broadcast of "visibility one and one-half" to a "new" ATIS message in an updated ATIS broadcast of "visibility one-zero" and determines that there is a disparity between these corresponding ATIS messages.

When a disparity is detected between a "new" ATIS message and a "previous" ATIS message, the comparison module 108 is configured to transmit the "new" ATIS message and the "previous" ATIS message to the processor module 110. The processor module 110 is configured to cause the display module 112 to display the change in the ATIS message for which a disparity is determined.

Figure 3:
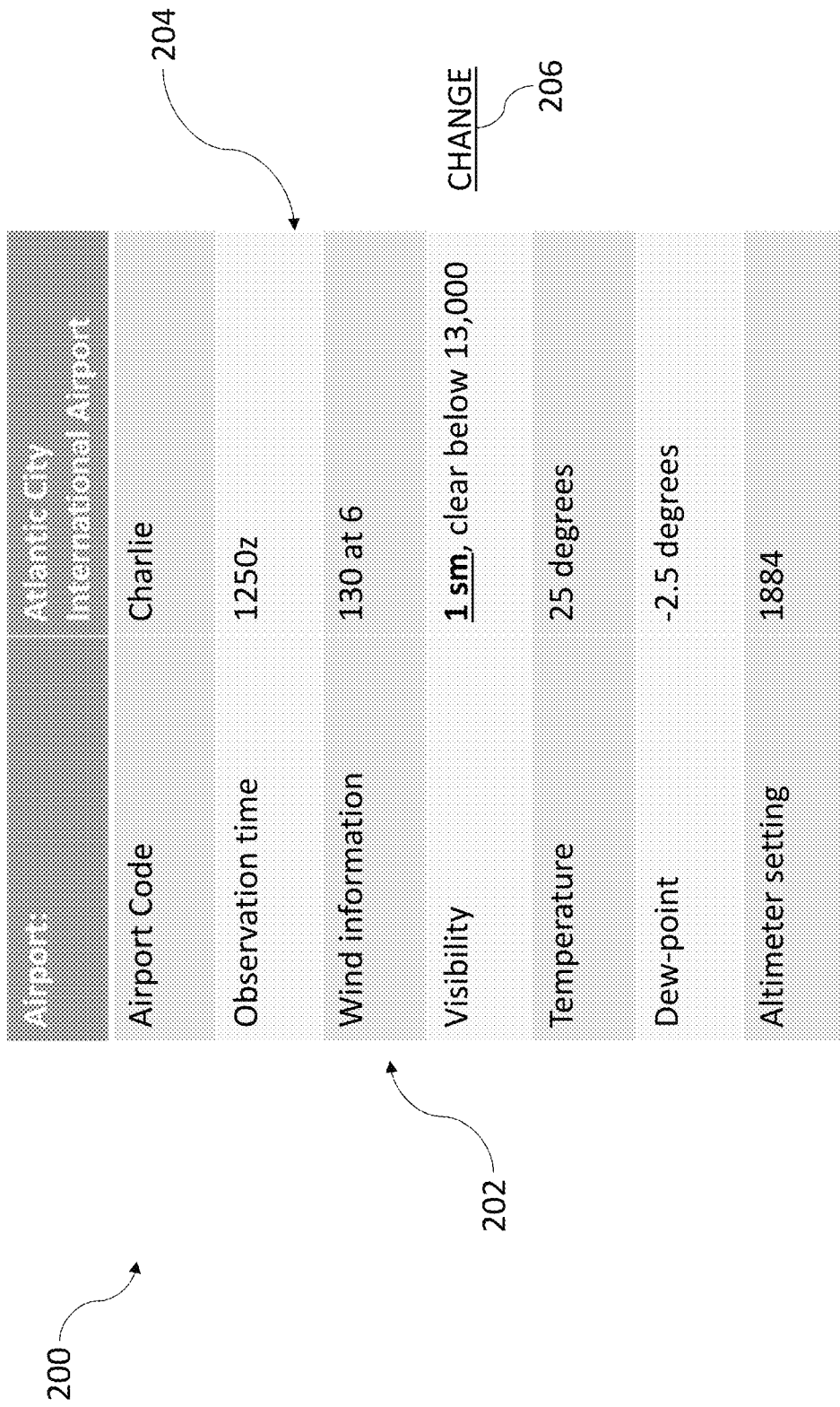
FIG. 3 shows an updated representation of ATIS information according to exemplary embodiments.

In an exemplary embodiment, the processor module 110 is configured to cause the display module 112 to update the information shown in table 200 so as to show the change in the ATIS broadcast. In an exemplary embodiment, and as shown in FIG. 3, the processor module 110 is configured cause the display module 112 to display a visual alert 206 proximate to the updated parsed ATIS message in the table 200 so as to notify the pilot which ATIS message has been updated. Additionally, the updated ATIS message may also be highlighted to the pilot, for example by formatting this ATIS message in a different manner to the remainder of the ATIS information. In this manner, the pilot is able to quickly identify which ATIS message has been updated without having to compare subsequent ATIS broadcasts or otherwise sort through large amounts of information. In exemplary embodiments, the updated ATIS message may be shown to the pilot in a "pre-confirmation" state, and the pilot may interact with the user interface 116 to accept this confirm acceptance of the updated ATIS message.

In another exemplary embodiment, the processor module 110 is configured to cause the display module 112 to display a representation to the pilot, which representation is altered on the basis of a change in the updated ATIS broadcast. The alteration of this representation will be explained with respect to FIGS. 4 to 6 with respect to the alteration of a displayed standard terminal arrival route (STAR). However, it will be appreciated that the techniques used herein are not applicable only to displayed STARs, but are also applicable to the alteration of other types of displayed representation, such as a displayed Instrument Approach Procedure (IAP).

Figure 4:
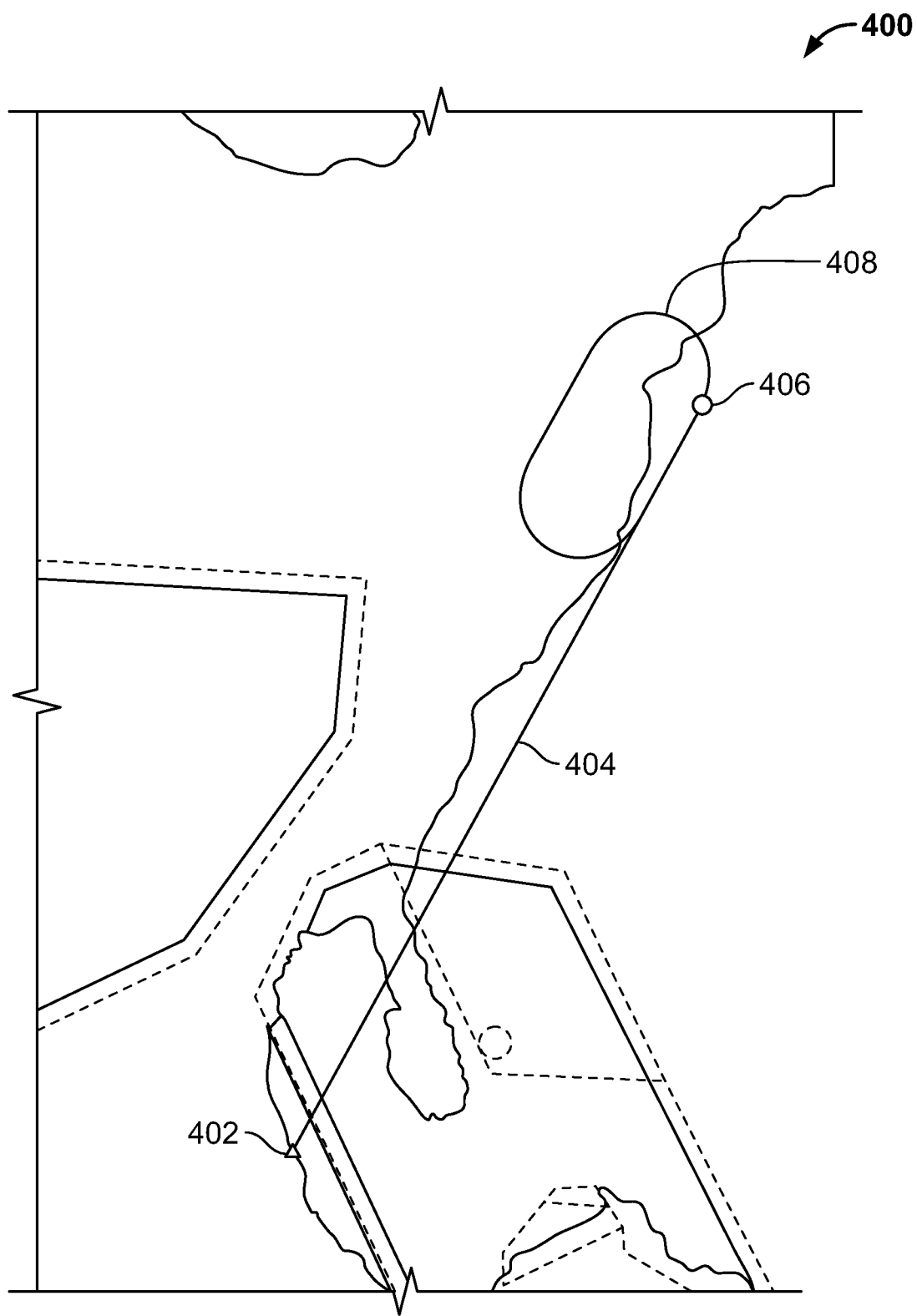
FIG. 4 shows a standard terminal approach route (STAR) on an aviation chart.

FIG. 4 shows a standard terminal arrival route (STAR) on an aviation chart 400. A STAR typically comprises a transition waypoint 402 indicating the beginning of the STAR. The STAR further includes a route 404 along which an aircraft should travel to arrive at the destination airport. The STAR further comprises an initial approach fix (IAF) 406, which marks the beginning of the aircraft's "landing" procedure. By having a dedicated STAR, air traffic control is able to have a greater knowledge of the path of arriving aircraft. A STAR may include a published holding pattern 408 to be used if Air Traffic Control needs to delay the aircraft for traffic flow reasons—for instance, if the runways are temporarily closed due to severe weather.

Figure 5:
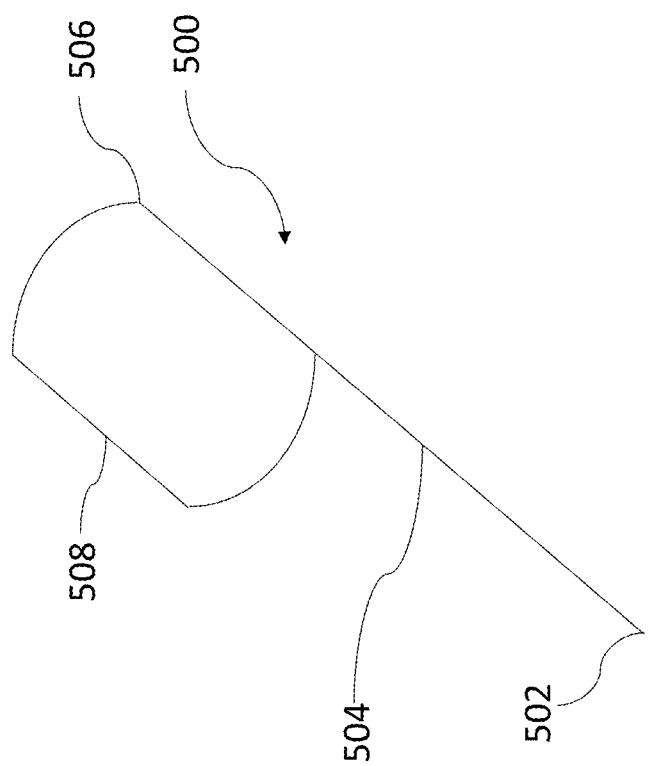
FIG. 5 shows a representation of the exemplary STAR approach of FIG. 4 in accordance with exemplary embodiments.

In exemplary embodiments, the processor module 110 is configured to cause the display module 112 to display a representation 500 of the STAR. An exemplary representation 500 is shown in FIG. 5, which includes a transition waypoint 502, a route 504, an initial approach fix (IAF) 506, and a holding pattern route 508. In use, the representation 500 may be displayed over a terrain map so as to indicate to the pilot the geographical position of these various waypoints and routes.

In an exemplary embodiment, when the comparison module 108 determines that there is a disparity between the "previous" set of parsed ATIS messages and the "new" set of parsed ATIS messages, the processor module 110 is configured to determine the effect of this disparity on the displayed information in the representation 500, and causes the display module 112 to adjust the displayed representation 500 accordingly so as to more accurately reflect the updated information in the ATIS broadcast. In an embodiment, the adjustment may be shown first in a "pre-confirmation" state so as to inform the pilot that an adjustment is being made. The pilot may then accept the adjustment through interaction with a user interface.

Figure 6:
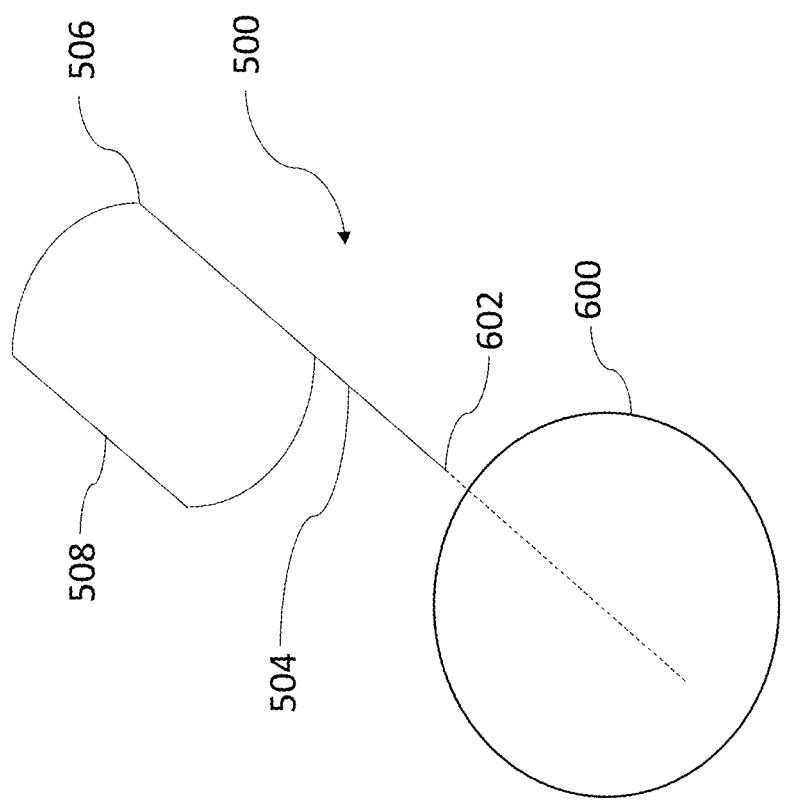
FIG. 6 shows an altered representation of the exemplary STAR approach shown in FIG. 5 in accordance with exemplary embodiments.

For example, referring to FIG. 6, the ATIS broadcast may be updated so as to include a notice to airmen (NOTAM) that airspace in a particular location 600, overlapping with the original transition waypoint 502, is temporarily restricted to aircraft. In this scenario, the processor module 112 determines, optionally using information from the FMS 114, that it is likely that a new transition waypoint will be positioned at a new geographical location 602. On the basis of this determined disparity (i.e., the inclusion of a NOTAM in the ATIS broadcast), the processor module 110 is configured cause the display module 112 to update the representation 500 so as to show the restricted airspace 600 and the "most likely" new position 602 of the new transition waypoint.

By changing the representation 500 displayed on the display module 112 on the basis of the updated ATIS broadcast, the pilot is able to easily identify the effect of updates in the new ATIS broadcast.

As will be evident from the content of this application, the information contained in the representation 500 need not be limited to the STAR or approach. In other exemplary embodiments, the representation may contain information about general airspace restrictions, weather warnings, runway closures, and so on.

Figure 7:
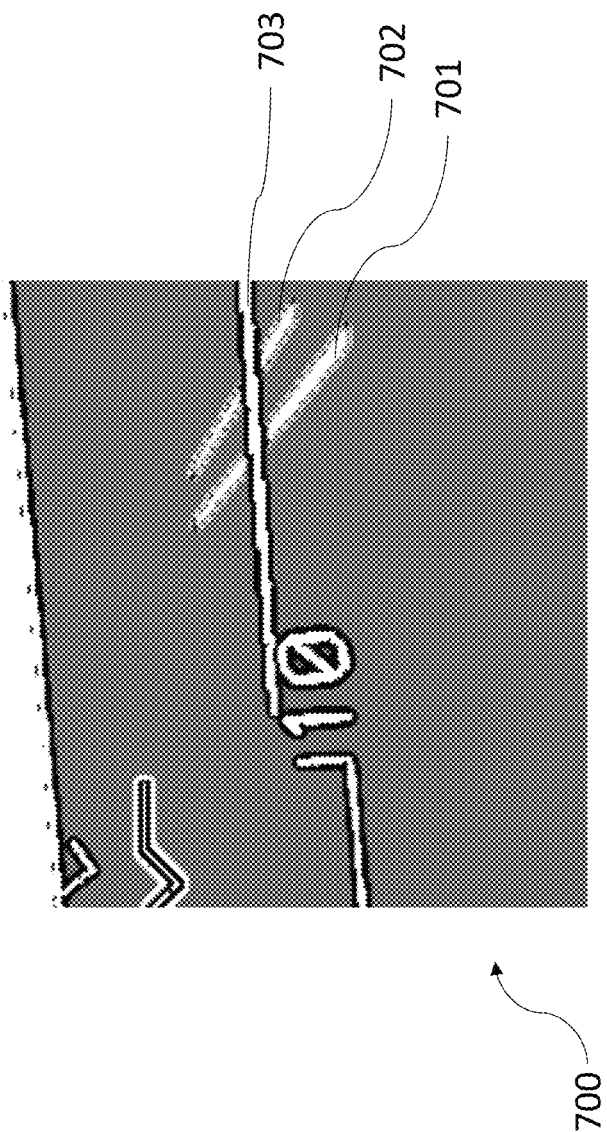
FIG. 7 shows a representation of an active runway in accordance with exemplary embodiments.

Another exemplary representation 700 is shown in FIG. 7. Representation 700 shows representations of runways 701, 702 and 703 of an airport. As can be seen in FIG. 7, runway 703 is shown in a highlighted manner to the pilot, indicating that runway 703 is an "active" runway suitable for landing the aircraft on. Representation 700 is generated in accordance with the most recent information in the ATIS broadcast. If the ATIS broadcast is subsequently updated to change the active runway, the comparison module 108 will determine a disparity between the "previous" set of parsed ATIS messages and the "new" set of parsed ATIS messages. The processor module 110 will then determine that the disparity relates to a change of active runway of the airport, and will cause the display module 112 to alter the representation to reflect the updated ATIS information. For example, if the ATIS broadcast is updated to notify pilots of an active runway change from runway 703 to runway 701, the processor module 110 is configured, on the basis of the "new" set of parsed ATIS messages to cause the display module 112 to stop highlighting runway 703 and instead highlight runway 701. The display may further flag instances in associated systems (e.g., FMS) where the "old" runway still remains selected.

Figure 8:
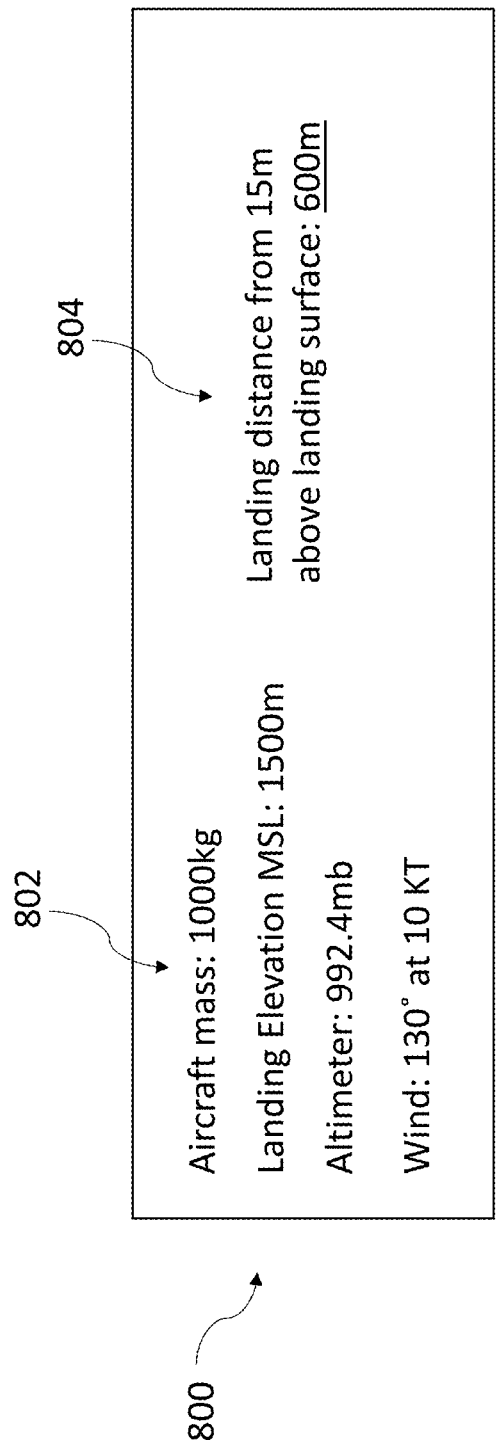
FIG. 8 shows a representation of takeoff and landing data (TOLD) calculations in accordance with exemplary embodiments.
Figure 9:
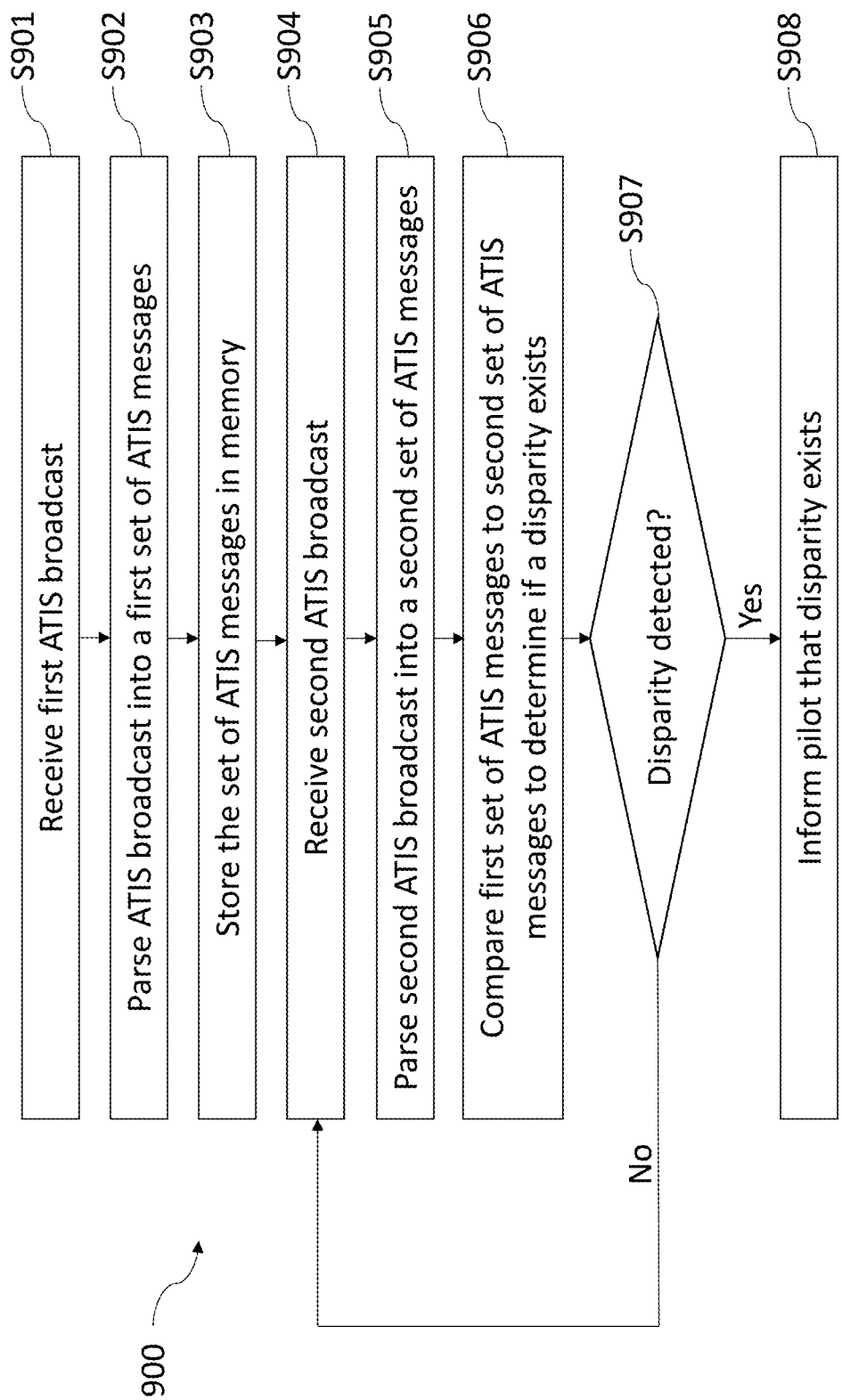
FIG. 9 shows a method in accordance with exemplary embodiments.

Another exemplary representation 800 is shown in FIG. 8. The representation 800 shows calculations associated with takeoff and landing data (TOLD). In particular, TOLD parameters 802 are used by the pilot to calculate a landing distance 804. This calculation may be automatically performed by the processor module 110. As will be appreciated, at least some of the TOLD parameters 802 (such as the altimeter setting or local wind information) may change on the basis of an updated ATIS broadcast. When a disparity is detected between a "previous" set of ATIS messages and a "new" set of ATIS messages in an updated ATIS broadcast, the processor module 110 is configured to determine if any of the TOLD parameters 802 require updating. If any of the TOLD parameters do require updating as a result of the detected disparity, the processor module 110 is configured to update the TOLD parameters accordingly. Furthermore, the landing distance 804 is also automatically re-calculated on the basis of the updated TOLD parameters. In this manner, the impact of the updated ATIS information can be shown to the pilot without the pilot having to perform a "head-down" calculations to re-calculate the landing distance, which improves the situational awareness of the pilot. It will be appreciated that this technique is not limited to the calculation of the landing distance and may also be used in the calculation of other values, for example the take-off distance. The system may further show graphically the "old" TOLD data next to the "new" TOLD data calculation, permitting the crew to participate and accept the "new" calculations prior to entry into the system A method 900 in accordance with exemplary embodiments is shown in FIG. 9. At step S901, a first ATIS broadcast is received using a receiver module. As explained above, the ATIS broadcast contains information to pilots regarding local conditions about an airport, which ATIS broadcast is formatted in a semi-standardized manner After receipt of the first ATIS broadcast, the method progresses to step S902.

At step S902, the first ATIS broadcast is parsed, using a parsing module, into a first set of ATIS messages. The first set of ATIS messages correspond to individual pieces of information about the airport's local conditions, such as local visibility and wind conditions, active runways, and so on. After parsing of the first ATIS broadcast into a first set of ATIS messages, the method progresses to step S903.

At step S903, the first set of ATIS messages are stored in a memory of a memory module. After storage of the first set of ATIS messages in the memory, the method progresses to step S904.

At step S904, a second ATIS broadcast is received using the receiver module. As explained above, ATIS broadcasts are typically updated at a set time each hour, or multiple times per hour. After receipt of the second ATIS broadcast, the method progresses to step S905.

At step S905, the second ATIS broadcast is parsed, using the parsing module, into a set of second ATIS messages. The second ATIS messages correspond to updated individual pieces of information about the airport's local conditions, such as local visibility and wind conditions, active runways, and so on. After parsing of the second ATIS broadcast into a set of second ATIS messages, the method progresses to step S906.

At step S906, the set of second ATIS messages are compared, using a comparison module, to the stored set of first ATIS messages so as to determine if a disparity exists between the first set of ATIS messages and the second set of ATIS messages. A disparity exists if, for example, one of the ATIS messages in the first set of ATIS messages is different to the corresponding ATIS message in the second set of ATIS messages. After the comparison at step S906, the method progresses to step S907.

At step S907, it is determined, using a processor module, whether a disparity between the first set of ATIS messages and the second set of ATIS messages was detected at step S906. If no disparity between these corresponds sets of ATIS messages was detected, the method reverts to step S904 until an updated ATIS broadcast is received (i.e., a third ATIS broadcast). If a disparity between the first set of ATIS messages and the second set of ATIS messages was detected at step S906, the method progresses to step S908.

At step S908, the pilot is informed, using the processor module and a display module, that a disparity exists between the first set of ATIS messages and the second set of ATIS messages. In an exemplary embodiment, the display module displays an updated ATIS message of the second set of ATIS messages to the pilot (for example, the new wind information) together with a visual indicator showing that the ATIS message has changed as compared to the first ATIS broadcast. In an exemplary embodiment, the display module alters a displayed representation based on the first ATIS broadcast to reflect the information in the updated ATIS broadcast. For example, the displayed representation may show a particular runway being highlighted to indicate that this runway is an active runway, based on information in the first ATIS broadcast. If, in the second ATIS broadcast, the active runway is changed, the displayed representation shows a different runway being highlighted.

While at least one exemplary embodiment has been presented in the foregoing detailed description, it should be appreciated that a vast number of variations exist. In particular, other techniques of presenting indications to the pilot regarding the color-based information of stored visual references exist, such as audio messages etc. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for displaying a change in an Automatic Terminal Information Service (ATIS) broadcast, comprising:
   a transmitter module configured to automatically request receipt of an ATIS broadcast at predetermined intervals of a first length;
   a receiver module configured to receive at least two ATIS broadcasts;
   a parsing module operably connected to the receiver module and configured to parse the received at least two ATIS broadcasts into at least two corresponding sets of ATIS messages;
   a comparison module operably connected to the parsing module and configured to compare the at least two sets of ATIS messages to determine if a disparity exists between the at least two sets of ATIS messages;
   a display module; and
   a processor module operably connected to the comparison module and the display module and configured to cause the display module to display information about the disparity when it is determined that a disparity exists between the at least two sets of ATIS messages.

2. The system of claim 1, further comprising a memory module operably connected to the parsing module and configured to store at least one of the at least two sets of ATIS messages.

3. The system of claim 1, wherein the processor module is further configured to cause the display module to display a representation of an effect of the disparity between the at least two sets of ATIS messages.

4. The system of claim 1, wherein, when an ATIS broadcast is not received in response to the request, the transmitter module is configured to continue requesting receipt of the ATIS broadcast at predetermined intervals of a second length shorter than the first length.

5. The system of claim 3, wherein the representation comprises a display of takeoff and landing data (TOLD) parameters, and wherein the processor module is configured to cause the display module to display updated TOLD parameters based on the disparity.

6. The system of claim 3, wherein the representation comprises a display of a standard instrument departure (SID), standard terminal approach route (STAR) or Instrument Approach Procedure (IAP), and wherein the processor module is configured to cause the display module to display an updated SID, STAR or IAP based on the disparity.

7. The system of claim 6, wherein the processor module is configured to estimate a position of at least one of a new transition waypoint and a new initial approach fix (IAF) and to cause the display module to display the estimated position.

8. The system of claim 3, wherein the representation comprises a display of active runways, and wherein the processor module is configured to cause the display module to display a change in active runways based on the disparity.

9. A method of displaying the effect of a change in Automatic Terminal Information Service (ATIS), comprising the steps of:
   automatically requesting, using a transmitter, a first ATIS broadcast at a predetermined time;
   receiving, using a receiver module, the first ATIS broadcast;
   parsing, using a parsing module, the first ATIS broadcast into a first set of ATIS messages;
   storing, using a memory module, the first set of ATIS messages in memory;
   receiving, using the receiver module, a second ATIS broadcast;
   parsing, using the parsing module, the second ATIS broadcast into a second set of ATIS messages;
   comparing, using a comparison module, the stored first set of ATIS messages to the second set of ATIS messages to determine if a disparity exists; and when a disparity is determined to exist, displaying, using a processor module and a display module, information about the disparity.

10. The method of claim 9, wherein the step of displaying information about the disparity comprises displaying a representation of an effect of the disparity.

11. The method of claim 9, further comprising the step of automatically re-requesting, using the transmitter, the first ATIS broadcast at predetermined intervals if the first ATIS broadcast is not received in response to the request.

12. The method of claim 10, wherein displaying the representation of an effect of the disparity comprises displaying takeoff and landing data (TOLD) parameters, wherein displaying the effect of the disparity comprises updating the TOLD parameters.

13. The method of claim 10, wherein displaying the representation of an effect of the disparity comprises displaying a representation of a standard instrument departure (SID), standard terminal arrival route (STAR), or an Instrument Approach Procedure (IAP) and wherein displaying the effect of the disparity comprises altering the representation of the SID, STAR or IAP.

14. The method of claim 13, wherein the step of altering the representation of the STAR or TAP comprises estimating an updated position of at least one of new transition waypoint and a new initial approach fix (IAF) and displaying the updated position.

15. The method of claim 10, wherein displaying the representation of an effect of the disparity comprises displaying a representation of active runways at an airport, and wherein displaying the effect of the disparity comprises altering the representation of active runways.

16. The method of claim 10, wherein displaying the representation of an effect of the disparity comprises displaying a table of ATIS data, and wherein displaying the effect of the disparity comprises altering the table of ATIS data and displaying a visual indicator positioned proximate to an alteration.

* * * * *

UNITED STATES PATENT AND TRADEMARK OFFICE
CERTIFICATE OF CORRECTION

PATENT NO. : 10,878,705 B1
APPLICATION NO. : 16/560535
DATED : December 29, 2020
INVENTOR(S) : Katarina Alexis Morowsky, Ivan Sandy Wyatt and Aaron Gannon Page 1 of 1

It is certified that error appears in the above-identified patent and that said Letters Patent is hereby corrected as shown below:

In the Claims

Column 11, Line 9, "TAP" should be changed to --IAP--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*